Figure 6:
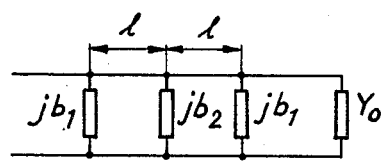

April 2, 1957     H. SCHEFTELOWITZ     2,787,766
FILTER FOR ELECTRIC LINE SYSTEM
Filed June 22, 1954     2 Sheets-Sheet 1
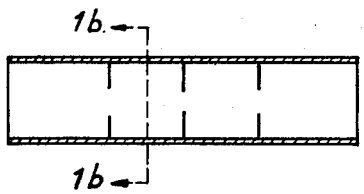  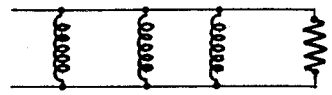
Fig. 1a     Fig. 1b     Fig. 1c
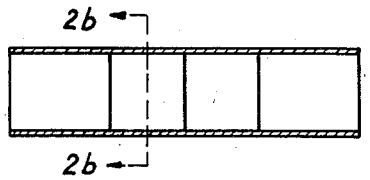  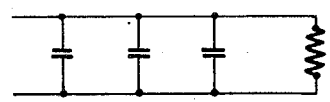
Fig. 2a     Fig. 2b     Fig. 2c
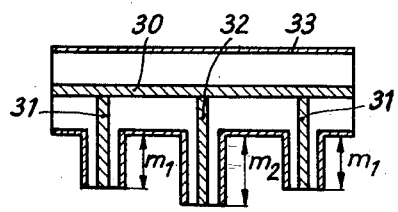 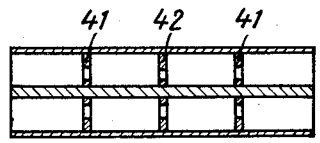
Fig. 3     Fig. 4
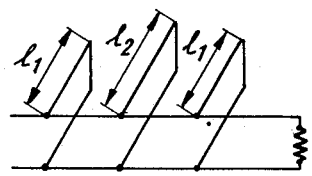
Fig. 5
INVENTOR
HENRY SCHEFTELOWITZ
BY Frederick E. Hane
ATTORNEY April 2, 1957     H. SCHEFTELOWITZ     2,787,766
FILTER FOR ELECTRIC LINE SYSTEM Filed June 22, 1954     2 Sheets-Sheet 2

INVENTOR
HENRY SCHEFTELOWITZ
By *Frederick E. Hane*
ATTORNEY

United States Patent Office 2,787,766
Patented Apr. 2, 1957

2,787,766
FILTER FOR ELECTRIC LINE SYSTEM

Henry Scheftelowitz, Stockholm, Sweden, assignor to Telefonaktiebolaget L M Ericsson, Stockholm, Sweden, a corporation of Sweden Application June 22, 1954, Serial No. 438,549

Claims priority, application Sweden June 30, 1953

4 Claims. (Cl. 333—73)

This invention refers to a filter for electric line systems. A filter according to the invention comprises a line system three susceptances connected one after the other and can be characterized in that the value of the middle susceptance is dependent on the value of each of the outer susceptances according to the relation:

$$\frac{1}{b_2} = a \cdot \cosh\left[\sinh^{-1} \frac{1}{ab_1^2}\right]$$

where $b_2$ is the value (with its sign) of the middle susceptance, $b_1$ is the value (with its sign) of each of the outer susceptances and $a$ is defined as $$k \cdot \frac{\Delta f'}{f}$$

were $f$ is the middle frequency of the filter, $\Delta f'$ is half the band width between the tops of the attenuation curve of the filter (i. e. the curve showing the attenuation of the filter as a function of the frequency) and $k$ is a number, approximately 3. In different cases $k$ may vary from 3.0 to 3.3.

The invention will be more closely described with reference to the accompanying drawing, where Figs. 1a and b show a sectional view of a wave guide with a filter according to the invention, and Fig. 1c shows the corresponding equivalent diagram, incoming susceptances being negative; Figs. 2a, b and c show another wave guide with a filter according to the invention and with the corresponding equivalent diagram, incoming susceptances being positive; Figs. 3 and 4 shows a sectional view of a coaxial conductor with filters, Fig. 5 shows a two-wire line with short-circuit lines, and Figs. 6–9 show some diagrams as a basis for a theoretical origin.

In the wave guide according to Figs. 1a and b there are three thin plates inserted one after the other across its longitudinal direction, in which plates a window is arranged, the longitudinal direction of which coincides with the direction of the short sides of the wave guide. These plates work as negative susceptances, and the dimensions of the windows are so chosen, that the value $b_2$ of the middle susceptance is dependent on the value $b_1$ of each of the outer, identical susceptances according to the relation:

$$\frac{1}{b_2} = a \cdot \cosh\left[\sinh^{-1} \frac{1}{ab_1^2}\right] \quad (1)$$

where $a$ is equal to $$\frac{3.0\ \Delta f'}{f}$$

$f$ being the middle frequency of the filter formed by the three susceptances together with intermediate wave guide parts, and $\Delta f'$ is half the band width between the tops of the attenuation curve of said filters.

The equivalent diagram according to Fig. 1c for the wave guide according to Figs. 1a and b shows three inductances connected in parallel in a line system which is terminated by its characteristic impedance, in this case thought of as solely resistive.

In the wave guide according to Figs. 2a and b three thin plates are inserted one after the other across its longitudinal direction in which plates a window is arranged, the longitudinal direction of which coincides with the direction of the long sides of the wave guide. These plates work as positive susceptances, and the dimensions of the windows are so chosen, that the value $b_2$ of the middle susceptance is dependent on the value $b_1$ of each of the outer, identical susceptances according to the relation (1) above with $$a = \frac{3.3\Delta f'}{f}$$

The equivalent diagram according to Fig. 2c for the wave guide according to Figs. 2a and b shows three capacitances connected in parallel in a line system, which is terminated by its characteristic impedance, also in this case thought of as solely resistive.

In the coaxial conductor according to Fig. 3 the inner conductor 30 is connected to the outer conductor 33 via three conductors 31, 32 and 31, arranged across the inner conductor and through holes in the outer conductor, said three conductors being at their outer ends short-circuited to tubular branches of the outer conductor 33. The length $m_1$ and $m_2$ respectively, of these branchings decides the kind and the size of the susceptances, forming the three conductors, and they are to be chosen so, that the Relation 1 will be valid.

In Fig. 4 a coaxial-conductor is shown, in which three susceptances have been formed by annular recesses in three plates 41, 42 and 41, respectively, perpendicularly arranged to the longitudinal direction of the coaxial line. The two outer plates are equal, the recess of the middle plate being smaller than the one of the outer plates. The annular recesses are to be dimensioned so, that the Relation 1 will be valid for the three susceptances with a $$a = \frac{3.3\Delta f'}{f}$$

In the two-wire line according to Fig. 5 three short-circuit lines with the lengths $l_1$, $l_2$ and $l_1$, respectively, are connected in parallel between the branches of the line. The lengths $l_1$ and $l_2$ are so chosen, that the Relation 1 is valid for the three susceptances which are formed by the three short-circuit lines. The line is terminated by its characteristic impedance.

For arrangements according to Figs. 3 and 5 it is valid that $a$ is equal to $$\frac{3.0\Delta f'}{f}$$

when the susceptances are negative, and equal to $$\frac{3.3\Delta f'}{f}$$

when the susceptances are positive.

In the described filters the outer susceptances ($jb_1$) are situated at a distance of about 1 from the middle susceptance ($jb_2$) where 1 is given by the relation $$\frac{2\pi l}{\lambda_g} = 3$$

in which relation $\lambda_g$ represents the wave-length, the corresponding frequency of which lies in the middle of the pass band of the mentioned filters. In practice it has proved suitable, in some cases, to make the resonators of the cavity about 1% shorter than as according to the mentioned relation, and to effect tuning by means of a screw.

Many other embodiments may be thought of without the scope of the invention being departed from. Thus, the windows of the wave guide according to Fig. 1 may for example be exchanged for circular recesses, which are to be dimensioned according to the same rule as mentioned above. The above mentioned relation between the susceptances in a filter according to the invention can be derived theoretically according to the following:

An equivalent admittance-diagram of a filter according to the invention is shown in Fig. 6, where three susceptances, $jb_1$, $jb_2$ and $jb_1$ are connected in parallel between the two branches of a line system at the distance 1 from each other, the line system being terminated by its characteristic admittance $y_0$. The diagram according to Fig. 6 may be altered into the equivalent diagram according to Fig. 7 by a division of the susceptance $jb_2$ into two susceptances $$j\frac{b_2}{2}$$

connected in parallel.

Figure 8:
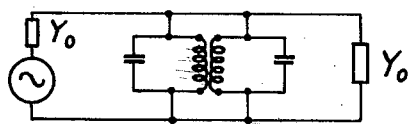

In Fig. 8 a system with two inductively coupled oscillating circuits is shown, which system at its input is fed from an oscillating generator over the admittance $y_0$ and at its output is terminated by the same admittance.

Figure 9:
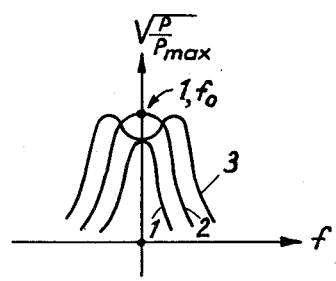

In Fig. 9 the magnitude $$\sqrt{\frac{P}{P_{max}}}$$

is shown as a function of the frequency $f$ of the system according to Fig. 8 with the coupling factor between the oscillating circuits as a parameter $P_{max}$ representing the maximally withdrawable effect and P the derived effect. Curve 1 is valid for less than critically coupled circuits, curve 2 for critically coupled circuits and curve 3 for more than critically coupled circuits.

Figure 7:
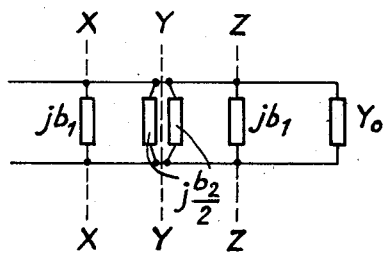

It can be proved that the system according to Fig. 8 can be reduced to a system according to Fig. 7 as regards the frequency characteristic.

In a section to the right $y$—$y$ in Fig. 7 there is a certain admittance, the value of which may be written $A+jB$. If, to said admittance, is added an admittance with the value $$j\frac{b_2}{2}$$

and if $$A+jB+j\frac{b_2}{2}$$

is in more than critically connected circuits equal to A, i. e. solely resistive for two frequencies $f_1$ and $f_2$, one condition for the calculation of $b_2$ is thereby obtained.

In a section $z$—$z$ of Fig. 7 the relative admittance is $1+jb_1$, and directly to the right of the section $y$—$y$ the relative admittance is, according to a wellknown line-theoretical formula:

$$\frac{y_0}{y}=\frac{(1+jb_1)\cdot\cos\theta+j\cdot\sin\theta}{\cos\theta+(1+jb_1)\cdot j\cdot\sin\theta} \quad (2)$$

$$\theta=\frac{2\pi l}{\lambda_g} \quad (3)$$

where 1 is the line-length between the susceptances and $\lambda_g$ is the wave-length of the actual electric energy. Through some trigonometrical transcriptions the Equation 2 can be written:

$$\frac{y}{y_0}=\frac{1}{1+\frac{b_1^2}{2}-\frac{b_1^2}{2}\cdot\cos 2\theta-b_1\cdot\sin 2\theta}+$$

$$j\cdot\frac{b_1\cdot\cos 2\theta-\frac{b_1^2}{2}\cdot\sin 2\theta}{1+\frac{b_1^2}{2}-\frac{b_1^2}{2}\cdot\cos 2\theta-b_1\cdot\sin 2\theta}=A+jB \quad (4)$$

If the frequencies $f_1$ and $f_2$ are given, the following relation for determining $b_2$ is thus obtained:

$$jB+j\frac{b_2}{2}=j\cdot\frac{b_1\cdot\cos 2\theta-\frac{b_1^2}{2}\cdot\sin 2\theta}{1+\frac{b_1^2}{2}-\frac{b_1^2}{2}\cdot\cos 2\theta-b_1\cdot\sin 2\theta}+j\frac{b_2}{2}=0 \quad (5)$$

which through trigonometrical transcriptions can be reformulated to:

$$\cos(2\theta+\psi_1+\psi_2)=\frac{1+\frac{1}{2}\tan^2\psi_1}{\sqrt{(1+\tan^2\psi_2)(1+\tan^2\psi_1)}} \quad (6)$$

where $$\tan\psi_1=-\frac{2}{b_1}$$
$$\tan\psi_2=-\frac{2}{b_2}$$

At more than critical couplings it is valid that the Equation 6 will have two solutions, i. e.

$$\frac{1+\frac{1}{2}\tan^2\psi_1}{\sqrt{(1+\tan^2\psi_2)(1+\tan^2\psi_1)}}<1 \quad (7)$$

which gives $$b_2<b_1^2\sqrt{1+\frac{4}{b_1^2}} \quad (8)$$

Equation 6 gives $$\arccos\frac{1+\frac{1}{2}\tan^2\psi_1}{\sqrt{(1+\tan^2\psi_2)(1+\tan^2\psi_1)}}=\pm(2\theta+\psi_1+\psi_2) \quad (9)$$

For practical purposes it is suitable to develop in series the Equation 6. At absolute band widths of less than about 100 Mc. within the C-band it is necessary, for a maximum fault of 5% to take only the terms:

$$\tan^2\psi_1=\left(\frac{2}{b_1}\right)^2 \text{ and } \tan^2\psi_2=\left(\frac{2}{b_2}\right)^2$$

wherefrom is obtained:

$$2\theta+\arctan\left(-\frac{\frac{2}{b_1}+\frac{2}{b_2}}{1-\frac{2}{b_1}\cdot\frac{2}{b_2}}\right)=\pm\sqrt{\left(\frac{2}{b_2}\right)^2-\frac{1}{4}\left(\frac{2}{b_1}\right)^2} \quad (10)$$

As already mentioned above two solutions corresponding to the frequencies $f_1$ and $f_2$ and the wave-lengths $\lambda_{g1}$ and $\lambda_{g2}$ respectively, are obtained at more than critical coupling, said wave-lengths being determined by the expression:

$$2\pi l\left[\frac{1}{\lambda_{g1}}-\frac{1}{\lambda_{g2}}\right]=\sqrt{\left(\frac{2}{b_2}\right)^2-\frac{1}{4}\left(\frac{2}{b_1}\right)^2} \quad (11)$$

where 1 is the length of a resonator, see Fig. 6. At absolute band widths of the size 20–100 Mc. within the C-band, it is possible with a maximum fault of 4%, to write $$\frac{2\pi l}{\lambda_g}=3$$

by means of which 11 changes to $$\left(\frac{3\cdot 2\Delta f'}{f}\right)^2=\left(\frac{2}{b_2}\right)^2-\frac{1}{4}\left(\frac{2}{b_1}\right)^4 \quad (12)$$

where $\Delta f'$ is the distance of the frequency between the tops of the frequency function according to Fig. 9.

If the designation $a$ is inserted for $$\frac{3\Delta f'}{f}$$

and some transformations are made, 12 changes to $$\frac{1}{b_2}=a\cdot\cos h\left[\sin h^{-1}\frac{1}{b_1\cdot a}\right]$$

I claim:
1. A symmetric line filter for more than critical coupling, comprising in a line system three susceptances connected one after the other characterized by the value of the middle susceptance depending on the value of each of the outer susceptances according to the relation

$$\frac{1}{b_2} = a \cdot \cos h \left[ \sinh^{-1} \frac{1}{ab_1^2} \right]$$

where $b_2$ is the value of the middle susceptance, $b_1$ is the value of each one of the outer susceptances and $a$ is defined as $$\frac{k\Delta f'}{f}$$

$f$ being the middle frequency of the filter, $\Delta f'$ half the band width between the tops of the attenuation curve of the filter and $k$ approximately equal to 3.

2. A symmetric line filter according to claim 1, comprising in a line system three susceptances connected one after the other, characterized by the incoming susceptances being negative and $k$ being equal to 3.0.

3. A symmetric line filer according to claim 1, comprising in a line system three susceptances connected one after the other, characterized by the incoming susceptances being positive and $k$ being equal to 3.3.

4. A symmetric line filter according to claim 1 characterized by the outer susceptances being situated approximately at the distance 1 from the middle susceptance, where 1 is obtained from the relation $$\frac{2\pi l}{\lambda_g} = 3$$

in which relation $\lambda_g$ represents the wavelength, the corresponding frequency of which lies in the middle of the pass band of the mentioned filter.

References Cited in the file of this patent
UNITED STATES PATENTS 2,585,563     Lewis et al.     Feb. 12, 1952